US012573931B1

(12) United States Patent
Deak, Sr.

(10) Patent No.: US 12,573,931 B1
(45) Date of Patent: Mar. 10, 2026

(54) VIBRATION POWERED ENERGY HARVESTING GENERATOR WITH METALLIC GLASS LAYER HAVING HIGH PERMEABILITY, AROUND COIL STRUCTURE

(71) Applicant: David Deak, Sr., St James, NY (US)

(72) Inventor: David Deak, Sr., St James, NY (US)

( * ) Notice: Subject to any disclaimer, the term of this patent is extended or adjusted under 35 U.S.C. 154(b) by 0 days.

(21) Appl. No.: 18/744,652

(22) Filed: Jun. 16, 2024

(51) Int. Cl.
*H02K 35/02* (2006.01)

(52) U.S. Cl.
CPC ................................... *H02K 35/02* (2013.01)

(58) Field of Classification Search
CPC ........ H02K 35/00; H02K 35/02; H02K 33/00; H02K 33/02; H02K 33/04; H02K 33/06; H02N 11/00; H02N 11/002; H02N 11/04
USPC ....... 310/29, 12, 12.12, 12.01, 12.03, 12.13, 310/12.16, 12.26, 15–25
See application file for complete search history.

(56) References Cited

U.S. PATENT DOCUMENTS

| | | | | |
|---|---|---|---|---|
| 5,231,336 | A * | 7/1993 | van Namen | F16F 7/1011 |
| | | | | 318/128 |
| 7,078,832 | B2 * | 7/2006 | Inagaki | H02K 7/14 |
| | | | | 335/238 |
| 9,473,854 | B2 * | 10/2016 | Yasuike | H04R 1/028 |
| 9,509,198 | B2 * | 11/2016 | Jahshan | H02K 21/24 |
| 10,630,142 | B2 * | 4/2020 | Kanaya | H02K 33/02 |
| 10,778,075 | B2 * | 9/2020 | Mao | H02K 33/12 |
| 11,114,926 | B2 * | 9/2021 | Delette | H02K 35/02 |
| 11,949,309 | B2 * | 4/2024 | Li | H02K 33/04 |

| | | | | |
|---|---|---|---|---|
| 12,278,535 | B2 * | 4/2025 | Gabrys | H02K 3/04 |
| 12,348,053 | B1 * | 7/2025 | Li | H02J 50/80 |
| 2003/0102739 | A1 * | 6/2003 | Yoneyama | H02K 33/06 |
| | | | | 310/81 |
| 2003/0146825 | A1 * | 8/2003 | Kaneda | H04M 1/03 |
| | | | | 381/396 |
| 2005/0073215 | A1 * | 4/2005 | Wang | H02K 3/46 |
| | | | | 310/85 |
| 2005/0093393 | A1 * | 5/2005 | Hirzel | H02K 3/28 |
| | | | | 310/268 |
| 2009/0033157 | A1 * | 2/2009 | Maemura | H02K 41/03 |
| | | | | 310/12.25 |
| 2009/0244731 | A1 * | 10/2009 | Yu | G03B 3/10 |
| | | | | 359/824 |

(Continued)

OTHER PUBLICATIONS

AmorphousSoftMagneticFe80B11Si9AlloyinTensileStressSensorsApplication.pdf.*

*Primary Examiner* — Maged M Almawri
(74) *Attorney, Agent, or Firm* — Joanne M. Martin

(57) ABSTRACT

The present invention is a mechanical energy harvesting generator of electricity, comprising a coil structure including a winding of an electrical conductor disposed over a coil length, and capable of inducing electricity therein in the presence of a moving magnetic field provided by a movable magnet, wherein the winding includes an aperture about which the electrical conductor is wound and having a path through the coil structure substantially parallel with the length that receives the movable magnet. A magnet is disposed to be movable in response to motions applied externally to the coil structure along the path through the coil aperture, and having magnetic poles disposed to provide the moving magnetic field experienced by the coil as the magnet is moved along the path, further characterized in that a metallic glass layer is disposed around the coil structure and a winding outer surface.

22 Claims, 9 Drawing Sheets

(56) References Cited

U.S. PATENT DOCUMENTS

| | | | | |
|---|---|---|---|---|
| 2010/0109462 A1* | 5/2010 | Calley | ................... | H02K 1/246 |
| | | | | 310/90 |
| 2010/0244603 A1* | 9/2010 | El-Refaie | ............... | H02K 1/278 |
| | | | | 310/152 |
| 2011/0291532 A1* | 12/2011 | Takeuchi | ............... | H02K 23/04 |
| | | | | 310/68 B |
| 2012/0039491 A1* | 2/2012 | Katz | ...................... | H04R 9/022 |
| | | | | 381/150 |
| 2012/0109029 A1* | 5/2012 | Ma | ......................... | H04R 11/02 |
| | | | | 310/16 |
| 2013/0076162 A1* | 3/2013 | Papakyriacou | ......... | B06B 1/045 |
| | | | | 267/153 |
| 2013/0342037 A1* | 12/2013 | Kawarai | ............... | H02K 35/02 |
| | | | | 310/30 |
| 2013/0342054 A1* | 12/2013 | Long | ...................... | H02K 11/25 |
| | | | | 310/71 |
| 2014/0103751 A1* | 4/2014 | Furukawa | ............. | H02K 35/02 |
| | | | | 310/25 |
| 2015/0172821 A1* | 6/2015 | Lee | ......................... | H04R 9/046 |
| | | | | 381/410 |
| 2015/0295485 A1* | 10/2015 | Sutani | ..................... | H02K 15/03 |
| | | | | 310/12.18 |
| 2015/0296280 A1* | 10/2015 | Lee | ............................ | B06B 3/00 |
| | | | | 381/412 |
| 2016/0134173 A1* | 5/2016 | Deak, Sr. | ............ | H02K 7/1876 |
| | | | | 290/1 A |
| 2017/0063172 A1* | 3/2017 | Shiohara | .................. | H02K 1/02 |
| 2017/0144191 A1* | 5/2017 | Mao | ....................... | B06B 1/045 |
| 2019/0157958 A1* | 5/2019 | Mao | ....................... | H02K 33/12 |
| 2019/0326501 A1* | 10/2019 | Gilbert | ................... | C04B 35/45 |
| 2019/0348896 A1* | 11/2019 | Delette | ................. | H02K 35/02 |
| 2020/0304005 A1* | 9/2020 | Mao | ....................... | H02K 33/16 |
| 2021/0067016 A1* | 3/2021 | Hunstable | ............. | H02K 16/02 |
| 2021/0328491 A1* | 10/2021 | Takahashi | ............. | H02K 33/16 |
| 2021/0359581 A1* | 11/2021 | Acharya | ............... | H02K 3/345 |
| 2022/0140717 A1* | 5/2022 | Neubauer | ............. | H02K 33/16 |
| | | | | 310/28 |
| 2023/0198364 A1* | 6/2023 | Li | ........................... | H02K 33/16 |
| | | | | 310/28 |
| 2023/0387742 A1* | 11/2023 | Gabrys | .................... | H02K 3/04 |

* cited by examiner

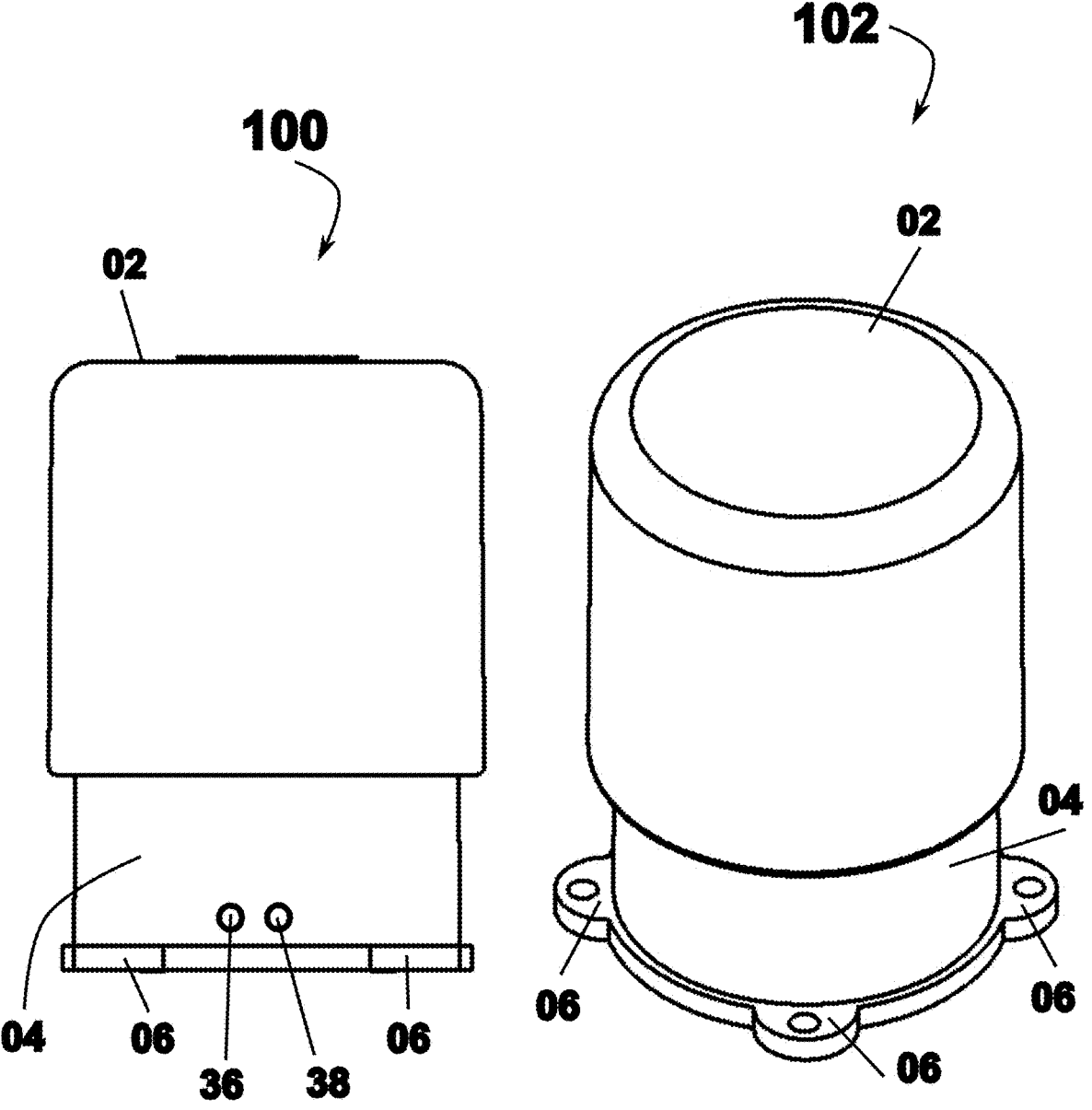
FIG. 1                    FIG. 2

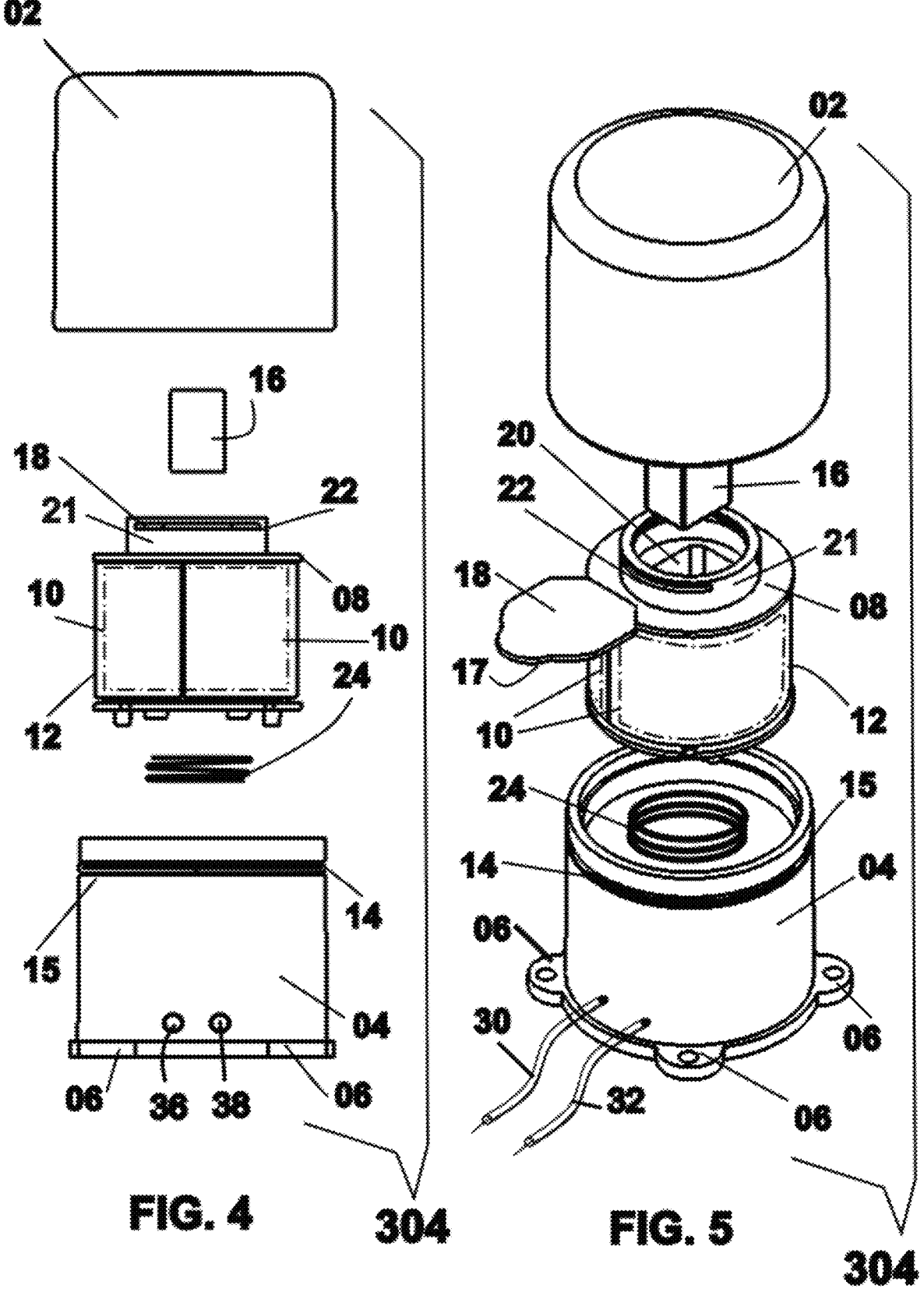
FIG. 4       304
FIG. 5       304

1600
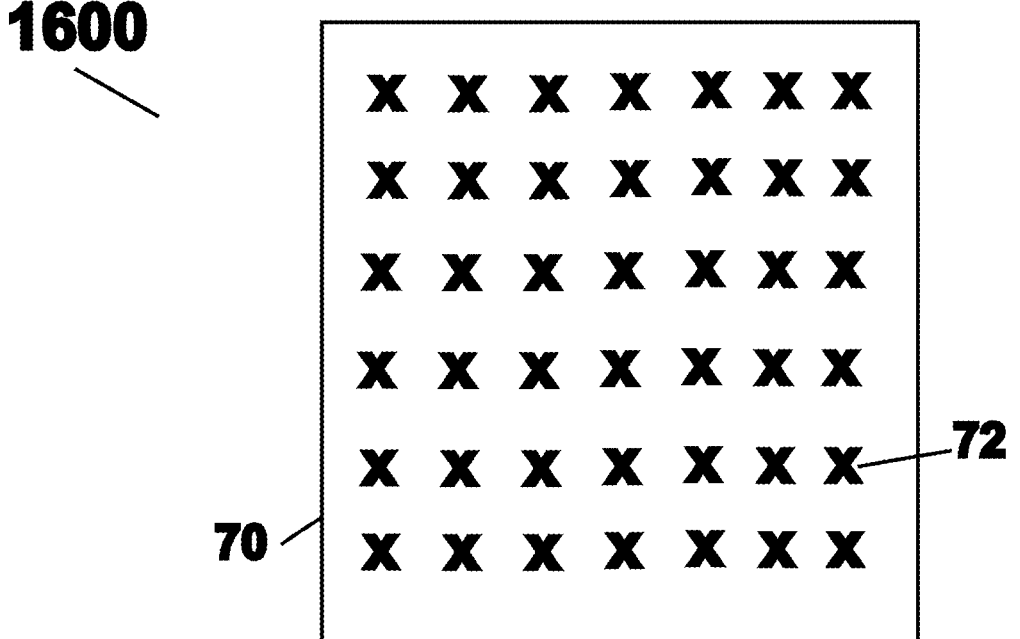
1602
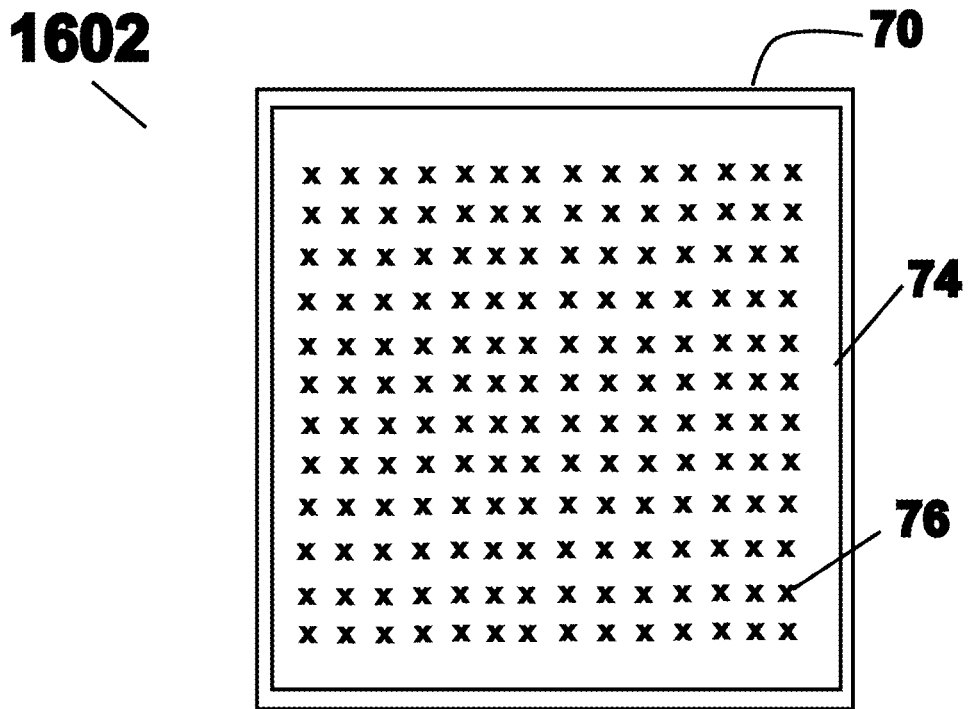
FIG. 16

VIBRATION POWERED ENERGY HARVESTING GENERATOR WITH METALLIC GLASS LAYER HAVING HIGH PERMEABILITY, AROUND COIL STRUCTURE

FIELD OF THE INVENTION

The present invention relates to generators providing electrical output in response to physical displacement of the generator structure, in particular, to small-scale energy harvesting generators responsive to induced relative motions of a magnet and a corresponding coil in turn, inducing an electrical power output.

BACKGROUND OF THE INVENTION

Energy harvesting generators are devices that capture and convert various forms of ambient energy into electrical power. These generators are essential for applications where traditional power sources are not available or practical, such as sustainable self-powered GPS tracking transceiver systems, vibrational power sources for ISM Band data transmission, LORA transceivers, commercial wearable LED lighting systems, healthcare patient tracking systems for dementia, autism patients, remote control self-powered vehicle trackers (GPS or local ISM Band types), and novel toys for personal entertainment applications.

In energy harvesting generators that induce and utilize variations in magnetic fields from applied mechanical displacements, movable magnets and/or other magnetic field modulating structures are used. One structure using high-permeability ($\mu$) material is found in "Nonlinear Vibration Energy Harvesting with High-Permeability Magnetic Materials," Advances in Energy Harvesting Methods pp 437-455, online 1 Jan. 2013, by Xing Xing & Nian X Sun, states, "The first generation energy harvester design consists of a high-permeability magnetic cantilever beam, in a solenoid, and a hard magnet pair that provides the biasing field. The mutual interaction between the vibrating highly permeable beam and the bias magnetic field of the magnets [of the embodiment of the paper] leads to maximized flux change and therefore a large, induced voltage." However, the reference's induced voltage results from the bending of a beam of high permeability material and static bias magnets to magnetically energize the device.

Unlike traditional crystalline metals used in a magnetic circuits like those typically in energy harvesting generators, another material known as "metallic glass" lacks the ordered atomic structure found in crystals, and yet may have high permeability. Instead of ordered crystalline material such as soft iron often referenced or used in magnetic circuits and generators, metallic glass has an amorphous, disordered atomic arrangement, like that of glass, hence the name. This amorphous disordered atomic structure gives metallic glass its unique properties, including exceptional strength, elasticity, corrosion resistance, and magnetic properties. While the development of energy harvesting generators desires to maximize their power output, prior moving-magnet energy harvesting designs have not considered or successfully applied the use of metallic glass within their structures.

Other limitations to efficiencies of energy harvesting relate to Lenz's Law:

$$E = -N(d\phi B\ dt) \tag{1}$$

where Lenz's law is a consequence of Faraday's law, and states that the direction of the induced EMF creates a magnetic field that opposes the change in magnetic flux that produced it. In the context of energy harvesting generators, this means that the induced current generated by the magnetic flux should create a magnetic field that inherently opposes the external magnetic field, thereby reducing the efficiency of prior energy conversion devices.

SUMMARY OF THE INVENTION

The present invention is an electrical, energy harvesting generator, comprising a coil structure including a winding of an electrical conductor disposed over a coil length and capable of inducing electricity therein in the presence of a moving magnetic field, wherein said winding includes an aperture about which the electrical conductor is wound and having a path through said coil structure substantially parallel with said length, and a winding outer surface, a magnet disposed to be movable in response to motions applied externally to said coil structure, along said path through said coil aperture and having magnetic poles disposed to provide said moving magnetic field as the magnet is moved along said path, characterized in that a metallic glass layer is disposed around said coil structure.

According to embodiments of the invention, the novel use of a metallic glass layer in a generator according to the present invention directs or concentrates the moving magnetic field into said winding, and/or substantially and at least partially to completely surrounds the winding of the coil structure.

As a group, one characteristic of 'metallic glass' is its permeability ($\mu$). Typically, permeability above $10^5$ is called 'magnetic metallic glass' and would be a type of 'metallic glass' of interest in the present invention. However, 'metallic glass' embodiments of at least around $3.5 \times 10^4$ could be used, and are for the purpose of this disclosure, considered to be 'magnetic metallic glass.' For example, products of Metglas® 2714A Alloy having a permeability of one million, or of EMR Shielding Solutions, Inc., MCF5 Magnetic Shielding Film having a permeability of one hundred thousand may be used.

When a coil with a movable magnet inside is subject to shaking (or impulse) vibrations causing both the coil and the magnet to move upward and downward together, this motion will induce a changing magnetic field in the coil. This changing magnetic field will induce an alternating current (AC) voltage in the coil according to Faraday's Law of electromagnetic induction. However, there are times when the movable coil's upward-and-downward movement and the movable magnet's upward-and-downward movement will be at certain times out of phase with each other, where the coil is moving upward when the magnet is moving downward, and when the coil is moving downward, and the magnet is moving downward. During such times and conditions, the phase, frequency, and instant amplitude of the movements vary differently to produce a complex sinusoidal output waveform that will affect the waveshape of the output wave and increase the voltage output, but now with a frequency shift that will shift the resonant frequency of the output waveform.

The induced voltage waveform in the coil will be an alternating voltage waveform that is sinusoidal, periodic, and/or complex in nature depending on the applied external exciting forces and the mechanical tuning (e.g. spring-magnet mass resonance, damping, etc.) of the generator. As the coil and magnet move relative to each other, the magnetic flux through the coil changes, resulting in the generation of an alternating current.

The amplitude and frequency(s) of the induced voltage waveform will depend on various factors such as the strength of the magnet, the number of turns in the coil, the speed and amplitude of the vibrations, the relative motion between the coil and the magnet, and the efficiencies of the magnetic circuit contributions of the metallic glass.

Moreover, the use of magnetic metallic glass as described and claimed, mitigates the effects of Lenz's law due to its low coercivity and eddy current losses. Such low coercivity ensures that the magnetic field of the metallic glass can be rapidly and easily be reoriented by the changing external magnetic field, reducing the opposition to the change in magnetic flux. Additionally, the low eddy current losses in metallic glass in the present invention minimize the unwanted energy dissipation caused by induced eddy currents, resulting in a more efficient energy conversion and harvesting process.

Furthermore, in view of the improved performance and efficiencies according to the present invention, embodiments of this invention can be made smaller, also be in another embodiment include or combined with a backup battery member connected to receive residual or low level energy harvested to trickle charge the battery backup member, and/or include circuitry (e.g. telemetry)) or applications in a common housing.

BRIEF DESCRIPTION OF THE DRAWING

These and further features of the present invention will be better understood by reading the following Detailed Description together with the Drawings, wherein, FIG. 1 is an elevation view of one embodiment for the present invention;

FIG. 2 is a perspective view of the embodiment of FIG. 1;

FIG. 4 is an exploded elevation view of the embodiment of FIG. 1;

FIG. 5 is an exploded perspective view of the embodiment of FIG. 1;

FIG. 16 is an illustration of a cross-section of the coil without the magnetic metallic glass, and with the magnetic metallic glass of one embodiment for the present invention;

DETAILED DESCRIPTION

Figure 3:
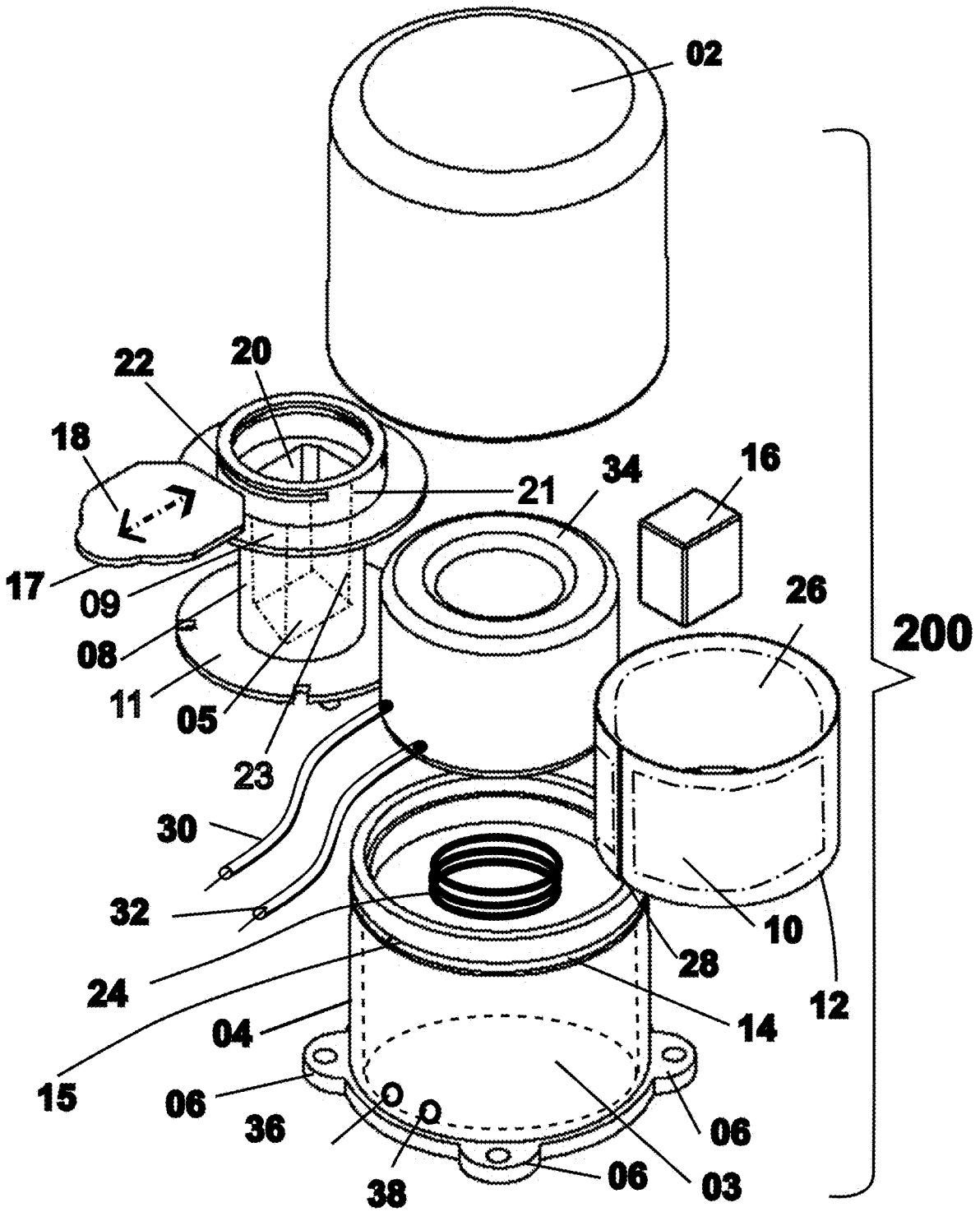
FIG. 3 is an exploded view of the embodiment of FIG. 1.

The illustration of FIG. 1 is an elevation view 100 of one exemplary embodiment of the present invention, which is an enclosure comprised of a bottom base cylindrical cup 04 with a blind hole and four thru-hole tabs 06 for securing the base 04 to some movable object that eventually will, due to numerous causes, become active in a vibratory motion action state. This vibratory action state is due to a wide spectrum of exciting external forces where abrupt motion occurs periodically, and its nature is pseudo-random, or it can be regular and/or narrow-band oscillations. There are two through holes 36 and 38 in the base section 04 of system 100 for power terminals/wires (shown as 30 and 32 in FIG. 3).

A perspective view 102 of FIG. 2 shows three of the four mounting tabs with through holes that are situated at the base rim of the base unit 04 that holds the coil and magnet assembly with its magnetic glass foil enhancement.

The exploded perspective view 200 of the embodiment of FIG. 1 is shown in FIG. 3 gives a different view of the top cover section 02 that is situated over the bottom base 04 and this top section 02 is held in place by the friction of the negative draft angle for the top section blind hole and the positive draft angle of the bottom base. To enhance this connection and act as a seal 14 (shown in FIG. 3) against water, other liquids, and dust, this seal 14 is disposed around an extruded channel 15 at the top of the bottom base 04. The entire embodiment is secured to some vibrational (moving) object of interest by four through-hole tabs 06. FIG. 3 shows all the system component members of this exemplary embodiment.

The assembly process for the exemplary embodiment of FIGS. 1-3 is as follows. In FIG. 3, a winding of copper wire 34 around the coil bobbin 08 is completed and secured with an adhesive liquid material to adhere the polymer insulation (not shown but thin compared to the wire diameter) typically on wire 34. Afterward, a 3-layer cover comprising a thin ribbon of magnetic metallic glass 26 (Metglas type 2714A) is adhered to a thin polymer plastic ribbon substrate 12 (MYLAR poly-plastic of thickness 0.20 to 0.40 mm+/−10%) that holds the magnetic metallic glass 26 against the coil on the inside (facing the coil) of the thin polymer plastic (e.g. Mylar) ribbon substrate 12, and further comprises a thin copper ribbon 10 is adhered to the outside of this thin polymer plastic ribbon substrate 12. The preferable dimensions for the Mylar polymer plastic ribbon 12 are substantially the height of the inner height (27 mm here and in FIG. 12) of the coil bobbin 08 wire winding 34, and its thickness of the Mylar polymer plastic is in the range of 0.40 to 0.60 millimeters, e.g. with its length equal to 98% (+/−10%) of that of the coil winding 34 circumference. Consequently, the dimensions for the magnetic metallic glass thin ribbon 26 are a height that is approximately 95% (+/−10%) of that of the polymer plastic ribbon 12 height (in millimeters), and its length is 97% (+/−10%) of that of the coil winding 34 circumferences (in millimeters). The thickness of the magnetic metallic glass material 12 is in a range of 0.2 to 0.4 millimeters. The dimensions for the thin copper ribbon 10 are a height of 95% {+/−10%) of the inner height of the coil bobbin 08 (in millimeters), and a length of 95% (+/−10%) of the coil winding 34 circumference (in millimeters). The thickness of the thin copper ribbon 10 ranges from 0.09 to 0.12 millimeters. The preferred embodiment 100 in FIGS. 1-3, contains the magnetic metallic glass 26 and uses it to efficiently enhance the generator's freely movable magnet 16 and its associated magnetic field, which is also utilized in another of the inventor's several other noval energy harvesting generators inventions now pending.

In the embodiment shown, the bobbin 08 inner height (27 mm) may also include an inner blind hole surface (05 in FIG. 3) that complements the cross-section shape of the elongated magnet, show here as a rectangular (square) cross-section, so that the inner surface would include a square opening. Such shaped inner surface 20 may be extended via bobbin extension 21, or the coil extension (FIGS. 03, 04, 05, 06, 07, and 12) may be an elongated form sufficient to provide protection for movement of the magnet 16 beyond the end of the coil winding 34 and receive other form members (e.g. door 17) that limit the outward movement of the magnet 34 and other embodiments include different complementary cross-sectional shapes. In the event that the reciprocating magnet is spaced from the bobbin inner surface 20 or of a non-complementary shape causing relative rotation (tumbling) of the magnet. When a coil with a movable magnet inside is subject to shaking (impulse) vibrations causing both the coil and the magnet to move up and down together, this motion will induce a changing magnetic field in the coil. This changing magnetic field will induce an alternating current (AC) voltage in the coil according to Faraday's Law of electromagnetic induction, e.g.

$$Eind=-N(Cos)\times[theta])\times(dB/dt) \tag{2}$$

The induced voltage waveform in the coil will be an alternating voltage waveform that is generally sinusoidal in nature, but if above the resonance of the magnet/spring frequency, the frequency of this induced voltage waveform will include the frequency of the vibrations or shaking causing the movement of the coil and magnet. As the coil and magnet move relative to each other, the magnetic flux through the coil changes, resulting in the generation of an alternating current.

As the magnetic metallic glass foil 26 interacts with the magnetic field generated by the coil magnet 16, it effectively concentrates and channels the magnetic flux lines, thereby intensifying the magnetic flux linkage with the coil windings. This, in turn, results in a higher induced electromotive force (EMF) within the coil, as described by Faraday's law of electromagnetic induction. (EMF=−N dB/dt, B the magnetic field of the coil magnet 16)

When exposed to a magnetic field, magnetic metallic glass foil 26 exhibits high magnetic susceptibility, allowing it to concentrate the magnetic field (increase the magnetic flux lines throughout the coil windings) and align with the external magnetic field of magnet 16 used in the present invention. This behavior leads to an increase in the magnetic flux density within and around the metallic glass foil 26 material, "amplifying" its interaction with nearby winding 34 conductors of the electromagnetic coil according to the unique magnetic properties of magnetic metallic glass 26 thus increasing induced voltage in energy harvester coils.

Thus, the application of magnetic metallic glass foil 26 wrapped around the winding of a coil provides a significant increase in the induced voltage within coil 34. The use of magnetic metallic glass foil 26 to enhance induced voltage in the system coil 34 has profound implications across various industries and technologies.

The coil winding 34 shown with the thin magnetic metallic glass ribbon 26 preferably against (facing) the outer surface of the coil winding 34 provides a power and/or energy conversion efficiency enhancement as described herein, and further embodiments include a copper ribbon 10 adhered to the opposite (outward facing) side of the copper ribbon 10, and preferably including of the polymer plastic substrate 12 between the thin magnetic metallic glass ribbon 26 copper ribbon 10, are (is) disposed around the coil bobbin 08, and may be retained to the coil windings 34 outer surface by a suitable adhesive. Next, the coil bobbin's 08 blind hole 20 has disposed within the blind hole a Neodymium magnet 16 that is free to oscillate within the blind hole 20, and in some embodiments, beyond the bobbin 08 and into the extension 21 When the magnet mass is combined with a spring rate, the combination has mechanical oscillations typically having resonance which may be chosen in consideration of the anticipated externally applied forces. This periodic oscillation is caused by enough of the externally applied force vibrations (typically 0.25-G to 1-G) that are a consequence of outside ambient gyrations caused by an object that the embodiment is attached to, to generate electrical power. If the coil's 34 voltage variations are monitored and recorded, this can act as a motion sensor when the coil terminals are connected to some sensing receiver circuit (Shown as 54 and explained in FIG. 15).

The coil, bobbin 08, top 02, etc. assembly is mounted and conditionally secured to the bottom of the base's 04 blind hole 05, by the coil bobbin's 08 bottom surface plane, by a thin non-magnetic spring 24 that allows for mechanical play up and down, with side-to-side angular movement based on any ambient environment impulsive motion action. Ergo, with vertical motion for the free-moving Neodymium magnet 16 that is free to oscillate vertically up and down, and now with the coil free within a substantial side-to-side range of jostling, caused by the non-magnetic spring 24 action, also contribute to the induced total voltage within the coil in addition to the voltage generated by the magnet's 16 up and down motion. This complex vectorial action produces a range of frequencies that are the vector summation of those voltage vectors. These periods of wave shaping remain sinusoidal, but their phase relationships can produce non-sinusoidal complex waves also.

To contain the (Neodymium) magnet 16 within the blind hole 20 of the coil bobbin 08, a slide-in door 18 is inserted (but can be moved in and out for magnet changing (simply changing the size of the magnet can increase or decrease the output power) and secured in the coil bobbin's 08 blind slit opening 22, and where the opening remains closed when the slide door 18 is pushed into the blind slit opening 22 that has an extension tab for easy push-in and pull-out 17.

Lastly, the coil wire terminals 30 and 32 are inserted through the two holes 36 and 38 at the bottom side of base 04, thus making the terminals available for electrical load connections. Placing the top half of the generator cylinder 02 over the base with the O-ring 14 that sits in its channel 15 completes the assembly of the sensor-generator and utilizing the O-ring 14 can have the generator receiving the status of an IP-65 rating for being water resistant. An IP65-rated enclosure gives protection against low-pressure water jets from any direction, as well as condensation and water spray. It's suitable for most outdoor enclosures that won't encounter extreme weather such as flooding. An IP65-rated (for preventing dust and moisture from entering the device) enclosure offers much more substantial protection against liquid ingress. This rating to some extent could protect from dust entry.

The exploded elevation view illustration 304 of FIG. 4 shows the members; top cap 02 that hovers over the remaining components of the free-moving (preferably Neodymium) magnet 16 (e.g. any N52 magnetic strength rated magnet), the coil assembly that contains the magnetic metallic glass ribbon 26 and copper wrap-around ribbon 10 adhered on opposite sides of the polymer plastic substrate 12. The coil assembly 08, 10, 12, 18, 22, hovers over the thin wide non-magnetic spring 24 that secures substantially and holds the coil assembly 08, 10, 12, 18, 22, to the bottom of the system base 04. The non-magnetic mechanical spring 24 is secured mechanically to the bottom of the coil bobbin and the floor bottom 05 by a substantial slide-in mechanical clip slot both on the bottom of the coil bobbin 08 and the base floor bottom 05 (all centered). The preferred embodiment utilizes a non-magnetic mechanical secured spring 24, and an alternative embodiment can utilize a special elastic polymer foam pad (not shown) that is simply placed at the bottom of the base floor 05 before the coil bobbin 08 is inserted into the blind hole 20. The purpose of the non-magnetic spring 24 as well as the special elastic polymer foam disk pad (not shown), is to provide increased sensitivity of triggering in the event of using the generator-sensor as a sensitive touch battery-less and wireless remote-control tap-switch, (or when not affixed to the magnet, a non-resonant suspension of the magnet 16 within the bobbin 08) embodiment for any useful application, where the minimum of mechanical energy is required to trigger a switching operation. This type of embodiment example could be used as a safety switch in a bathroom or shower stall in case of a medical emergency. With this increased sensitivity the present invention can be utilized as a seismic sensor and as a precise machine axle off-balance detector to prevent excess wear and tear on mechanical shafts and other mechanical gear and shaft systems.

Figures 6, 7, 8, 9, 10, 11:
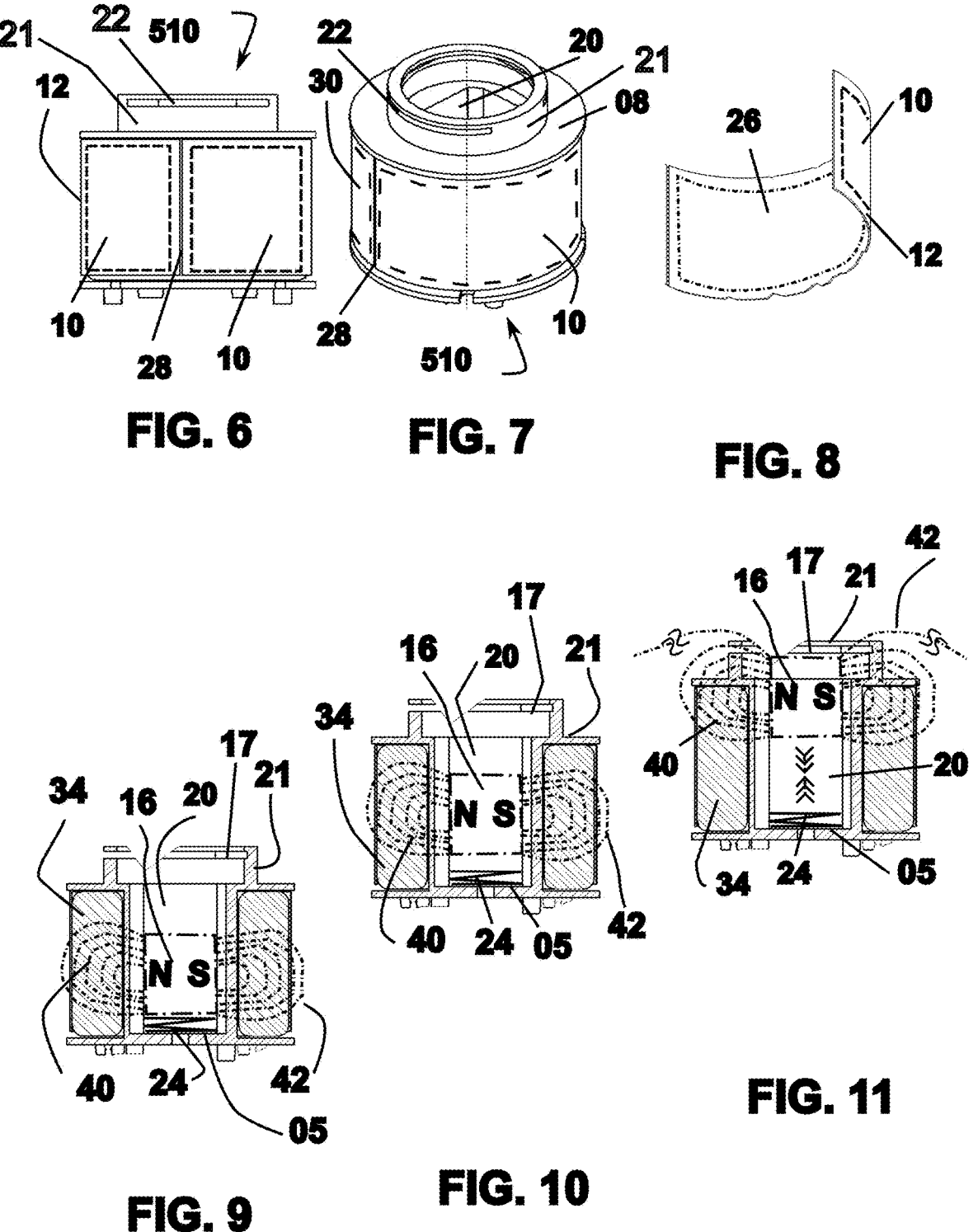
FIG. 6 is an elevation view of the coil assembly of the embodiment of FIG. 1.
FIG. 7 is a perspective view of the coil assembly of the embodiment of FIG. 1.
FIG. 8 is a perspective view of the magnetic-glass and copper magnetic field coupler of the embodiment of FIG. 1.
FIG. 9 is a cross-section view of the lower magnet position in a static state before vibratory forces are applied to the system of the embodiment of FIG. 1.
FIG. 10 is a cross-section view of the intermediate magnet position during the application of vibratory forces of the embodiment of FIG. 1.
FIG. 11 is a cross-section view of the upper magnet position of maximum height during maximum applied impulsive forces of the embodiment of FIG. 1.

The exploded elevation view 304 in FIG. 4 and perspective view of the system in FIG. 5 of the system according to one embodiment of the present invention, shows the blind hole 20 of the coil that receives the (Neodymium) magnet 16 and is located and travesl from the lowest position defined by the blind hole floor to any intermediate position to the upper-most position defined by the slide-in moveable thin door 18, through its position in the open blind slit 22, (as illustrated in FIGS. 9, 10, and 11)

FIG. 6 shows the elevation view summary of the coil and bobbin assembly 510 with its 98% wrap-around of the polymer plastic substrate 12 that is visible on the outside, the thin copper ribbon 10, and the non-visible thin magnetic metallic glass ribbon 26 that is on the inside of the polymer plastic substrate 12. As shown in FIGS. 6-8, magnetic metallic glass 26, copper layer 10, and plastic substrate 12 may have different external dimensions, e.g. the substrate extending beyond magnetic metallic glass 26 and/or copper layer 12.

FIG. 7 illustrates the summary perspective view of the coil assembly 510 showing the coil blind hole 20, which is the blind chamber hole 20 where the Neodymium magnet 16 is free to travel up and down, to the position limits defined by the blind hole's floor (lowest travel position, shown in FIG. 9), and the slide-in door 17 (highest travel position, shown in FIG. 11) and also travels through the intermediate travel position (through the up and down position point, shown in FIG. 10).

FIG. 8 illustrates the summary perspective view of the magnetic metallic glass 26 permeability magnetic flux coupler, and copper foil 10. It is comprised of the outside (by definition) copper ribbon 10, the intermediate polymer plastic substrate 12, and the inside facing magnetic metallic glass with high relative D.C. permeability preferably in the range of 500,000 to 1,000,000 H/m [Henry per meter]). Relative permeability is $\mu_r = \mu_g/\mu_o$ ($\mu_g$=the permeability of the glass, $\mu_o$=the permeability of free space that is $1.257 \times 10^{-6}$ H/m Several techniques to strengthen the magnetic flux through a coil are:

Increase the number of coil turns;

Increase the strength (size) of the free-moving Neodymium through the coil; or

Wrap the coil tightly around the iron (theoretical reference) core, which is a conventional way relative to the present invention. Contrary to conventional means, the present invention utilizes a "dynamic central core" in the form of a magnet that is free to move or oscillate within the confines of the coil bobbin's blind hole 20 such as from externally applied vibrations received by an unattached (or attached) magnet bouncing in a hole).

However, with the current invention, instead of winding the coil wire-wound core 34 tightly around a hypothetical solid soft-iron cylinder rod (theoretical reference core) situated in the coil bobbin's center, an enhancement to the magnetic circuit is provided by a thin magnetic metallic glass ribbon 26 that is external to the coil windings, e.g. wrapped around the "outside" of the coil winding 34, thus enhancing the overall dynamic magnetic field flux (shown in FIGS. 9, 10, & 11 as 40 and 42) that varies in accord with the vibrations of any object (multi-wheeled vehicle, push-bike, shipping containers, etc.) the present invention is mechanically attached to. Further, this feature is not limited to utilizing thin (e.g. 0.02+/−10% mm.) magnetic metallic glass foil with (extraordinarily high DC permeability (e.g. 5×10^5 to 1×10^6).

Another alternative embodiment could utilize another thin (0.02 mm+/−10%) magnetic metal foil but perhaps with a different increase in power output of the generator as compared to utilizing magnetic metallic glass, with or without the copper foil addition separated from the thin (0.02 mm+/−10%) magnetic metallic glass foil.

FIG. 9 is an illustration of the cross-section view, of the lower magnet position 16 situated within blind hole region 20 of the coil bobbin 08, and at rest at its bottom floor 05, before any externally applied vibrations (or motions) exist, and during the G-Force action of Earth's gravitational field upon the magnet at its descending path. During a rest condition, before any vibrations are felt by the present embodiment of the present invention, the Neodymium magnet 16 sits at the bottom of the blind hole floor 05 ready to react to any movement of the preferred generator/sensor embodiment. Also during this rest (non-vibrational) situation, the permanent magnetic field (static) and is not in a dynamic (i.e., is not moving and changing) state. The magnetic field 40 permeates throughout the coil winding. Also, because of the magnetic metallic glass. FIG. 9, and while the compressed spring and the magnet are in contact (normally not joined in one embodiment), the embodiment can represent an initial rest state before any ambient vibrational activity occurs, and it can also be the result of the maximum magnet 16 cyclic down state for a series of cyclic vibrational oscillation activities, which can be seen as continuous, and time-separate pseudo-random impulsive start and stop state conditions. Also on the down impulse state, there is an exchange of momentum (redundant, because no energy, no momentum} that compresses the spring (there is energy from moving magnet (instant reference state −9.8 (m/s^2) . . . KE=1/2 mv^2) hitting the bottom of the blind hole (this energy now becomes PE=0) that for an instant is in contact with the magnet producing an added amount of momentum and rendering a resultant upward push amongst the base floor 05, the spring 24, and the magnet 16. This action can have an added energy effect (when the magnet hits the coil bottom, and the coil bottom hits the bottom of the enclosure half) on the dynamic mechanical-to-electrical energy-producing state of the system. Thus, this activity during these induced mechanical vibrations that have a maxima distal position 17 that is determined by the blind hole 20 centre to the bottom 17 of the stopper door 18, relative to the bottom minima position 05, which is the bottom of the blind hole floor 05.

FIG. 10 is an illustration of the cross-section view, of the intermediate magnet position 16 situated within the coil bobbin's blind hole region 20, at its centre position where the Neodymium magnet 16 can be in transition either going (in a relatively (compared to coil winding 34) upward direction or going in a downward direction. Plus an effect of the high permeability magnetic metallic glass ribbon 26 provides a magnetic conduit that maintains a channeling of the changing magnetic field in flux throughout the coil wire windings, with a substantially reduced minimal amount of the magnetic field extending beyond the volume 42 of the coil windings. The copper foil ribbon 10, on the opposite (typically outward) side of the non-magnetic polymer plastic ribbon 12 is there to counteract the natural CEMF (counter electromotive force) produced by the CEMF (counter electromotive force) of the magnetic metallic glass film ribbon 26, and this is due to the high magnetic permeability (ranging from 5×10^5 to 1×10^6) of the magnetic metallic glass foil ribbon 26.

FIG. 11 is an illustration of the cross-section view, of magnet 16 upper position situated within the coil bobbin's blind hole region 20, and, at some point, in time due to the Neodymium magnet 16 being active and (by gravity or an added force by an appropriate structure), returning through the intermediate transition downward to the bottom floor 05, ready for any new future externally applied vibrations, either impulsive or periodic, in nature.

Figures 12, 13, 14:
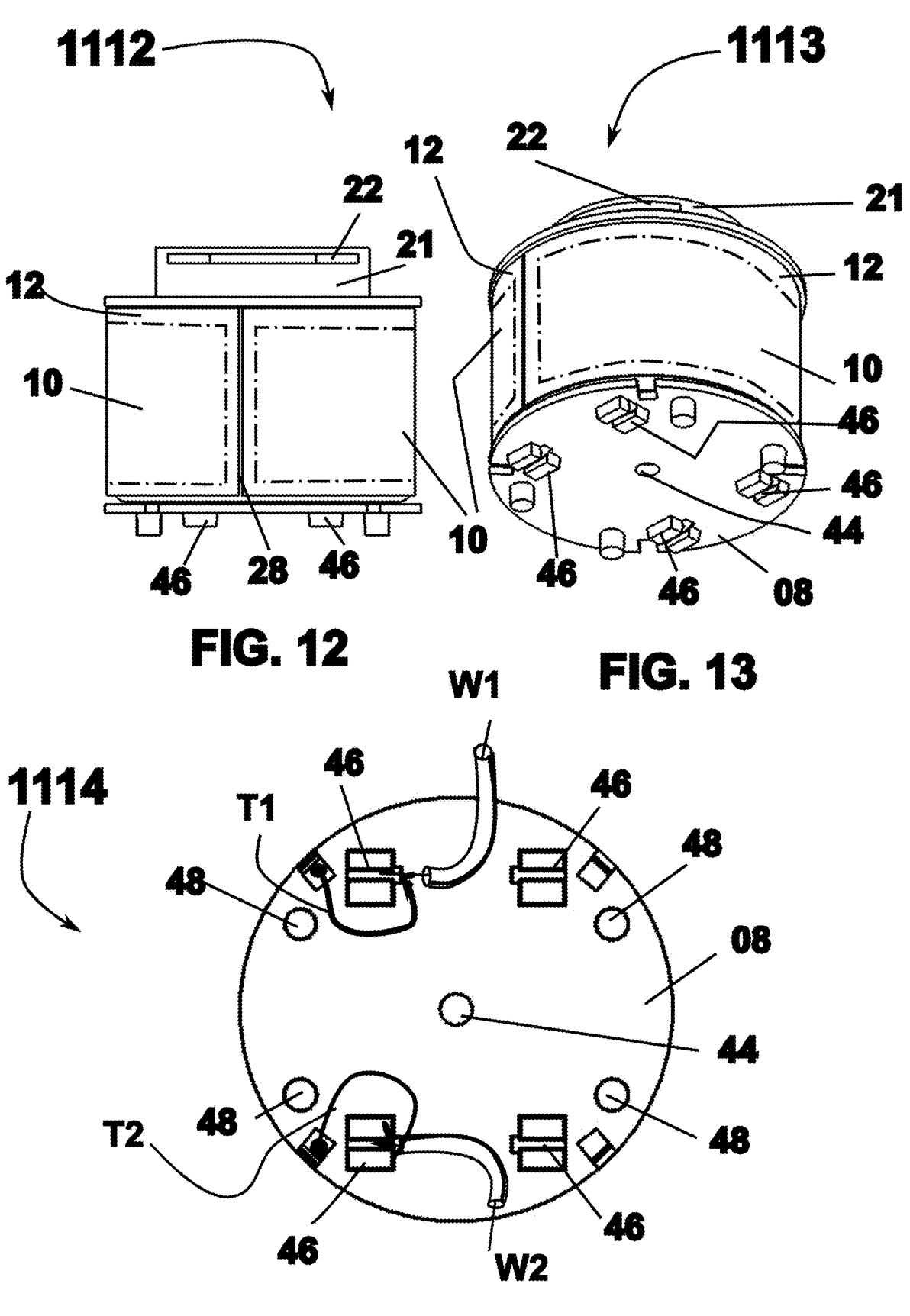
FIG. 12 is an elevation view showing the coil wrap-around, magnetic glass, and copper magnetic field coupler of the embodiment of FIG. 1.
FIG. 13 is a perspective view of the coil assembly showing the four stationary bumpers and the four separate coil terminal-to-extended wire connections to possible electrical loads of the embodiment of FIG. 1.
FIG. 14 is a bottom-view illustration showing the four separate bumpers, and the four separate coil terminal-to-extended wire connections to possible electrical loads of the embodiment of FIG. 1.

FIG. 12 is an elevation view of coil assembly 1112 that shows the wound coil bobbin 08 extension 21 in FIG. 3 includes the top coil door slot 22 to receive a magnet securing door 18 which retains the magnet 16 (also shown in other figures). Also shown is the foil ribbon assembly comprised of the substantially thin magnetic metallic glass foil ribbon 26, the substantially thin polymer plastic substrate foil ribbon 12, and the substantially thin copper foil ribbon 10.

FIG. 13 is a perspective view 1113 of the present invention's coil assembly from below that also shows the bottom 05 of the coil bobbin 08. There are four connexion tabs 46 that accept wire connexions to output terminals 45, shown in FIG. 14, and FIG. 14 is the bottom view 1114 of the coil bobbin 08. {In FIG. 14 the output terminal wires 45 and 47 are connected to the end terminals 41 and 43 respectively of the coil winding (wires or connections are not shown.) Also in FIG. 13 and FIG. 14, there are four spacing standoff tabs 48 that act to elevate the coil bobbin assembly once it is inserted into the generator base 04 (shown in FIG. 01 and other figures.)

Figure 15:
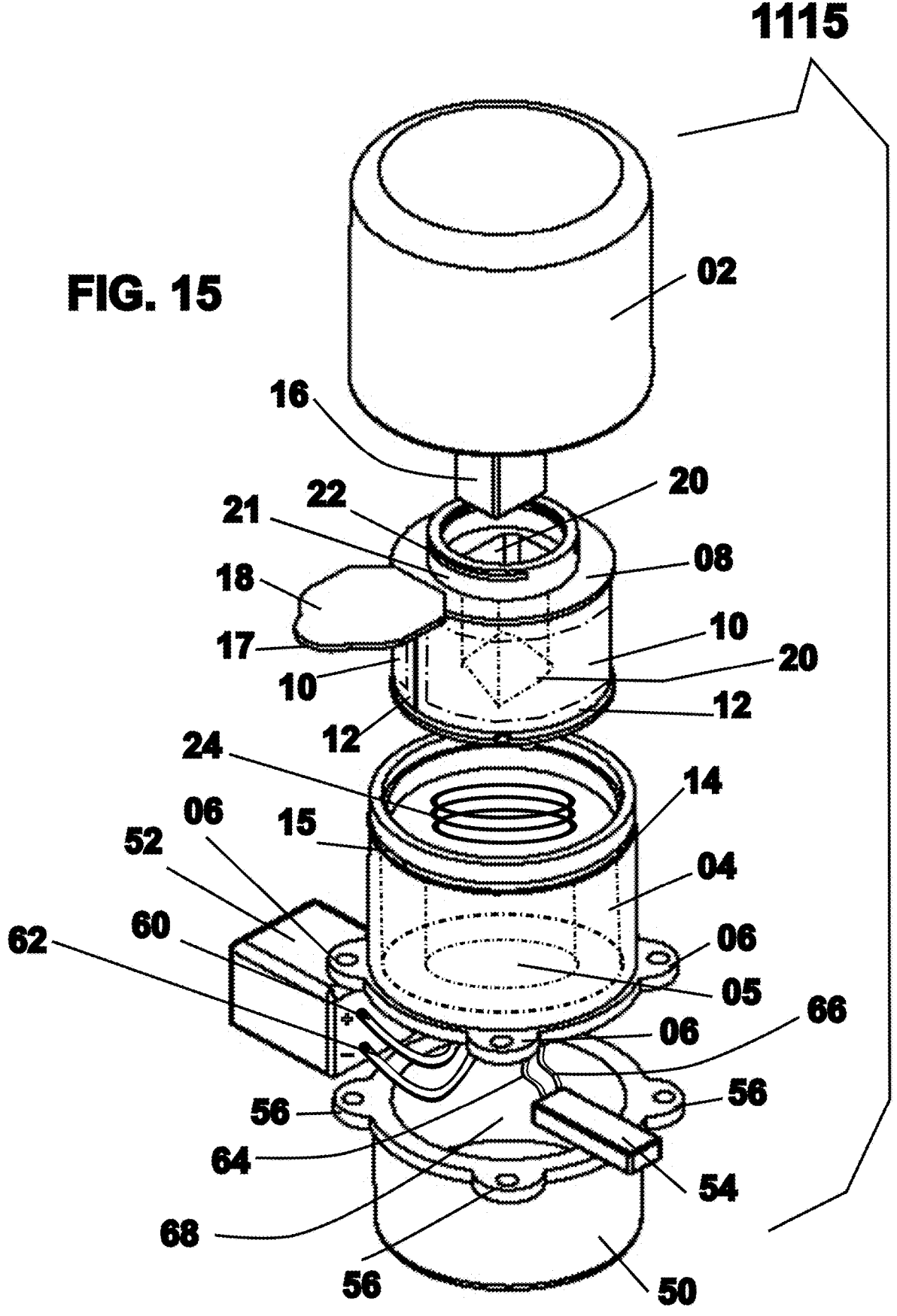
FIG. 15 is a perspective view of one embodiment of the generator connected to a battery and trickle charger of the embodiment of FIG. 1.

FIG. 15 shows a perspective view of another embodiment 1115 with a battery 52 and trickle charger circuit 54. This embodiment 1115 of the present invention can be utilized as a combination battery pack and trickle charging circuit. This embodiment 1115 functions as the present invention's generator that is utilized as a means for maintaining a trickle-to-full charge method for providing constant power output from a rechargeable battery 52 that is contained, along with its regulated trickle charging circuitry 54, in a lower add-on base cup 50. This lower base cup is secured by four bolts to the generator base 04 by four bolts that connect the four through-hole tabs 06 on the generator to the four through-hole tabs 56 on the lower base cup 50, with a water-tight seal (not shown) for IP-65 certification for water and dust proofing. The two connecting wires 64 and 66 from the trickle charging circuit 54 are connected to the two wires 62 and 60 respectively (observing polarity) from the battery pack 52 or can instead be received by a circuit for vibration sensing in 54 or transmitted therefrom.

FIG. 16 shows a cross-section 1600 of the coil winding 34 areas (shown in FIG. 3) comparing "without" the magnetic metallic glass foil (shown as 26 in FIGS. 12 & 13) and its distribution 72 throughout the test area region 70, against 'with' magnetic metallic glass foil 26. This first flux concentration 72 (shown as capital "X"), is one of several factors that determine the induced voltage in the coil windings 34. Also, the rate of change (from externally applied motions) of that concentration is directly proportional to the output voltage, along with the number of turns of the coil 34 in question.

FIG. 16 also shows a cross-section 1602 of the coil (shown in FIG. 3) winding 34 areas, is shown "with" the magnetic metallic glass foil 26 (shown as 26 in FIGS. 12 & 13), and its (Flux as lower case "x" 76) distribution flux line representation 76 throughout the test area 70. This increased concentration in foil region 74 will, compared to the absence of the magnetic metallic glass foil 26 according to the present invention, increase the induced voltage at the coil terminals and thus increase the amount of power available for use. Ergo, with the magnetic metallic foil 26 wrapped around the outside layer of the coil winding 34, and with the magnet 16 (shown in FIG. 3 as 16) that is located within the centered blind hole 20 (shown in FIG. 3), and further as this magnet 16 is free to oscillate, jostle, and move up and down upon being exposed to externally applied motions or vibrations from some external system that the generator is attached and secured to, a substantial amount of increased power will be developed according to embodiments of the present invention.

Figure 17:
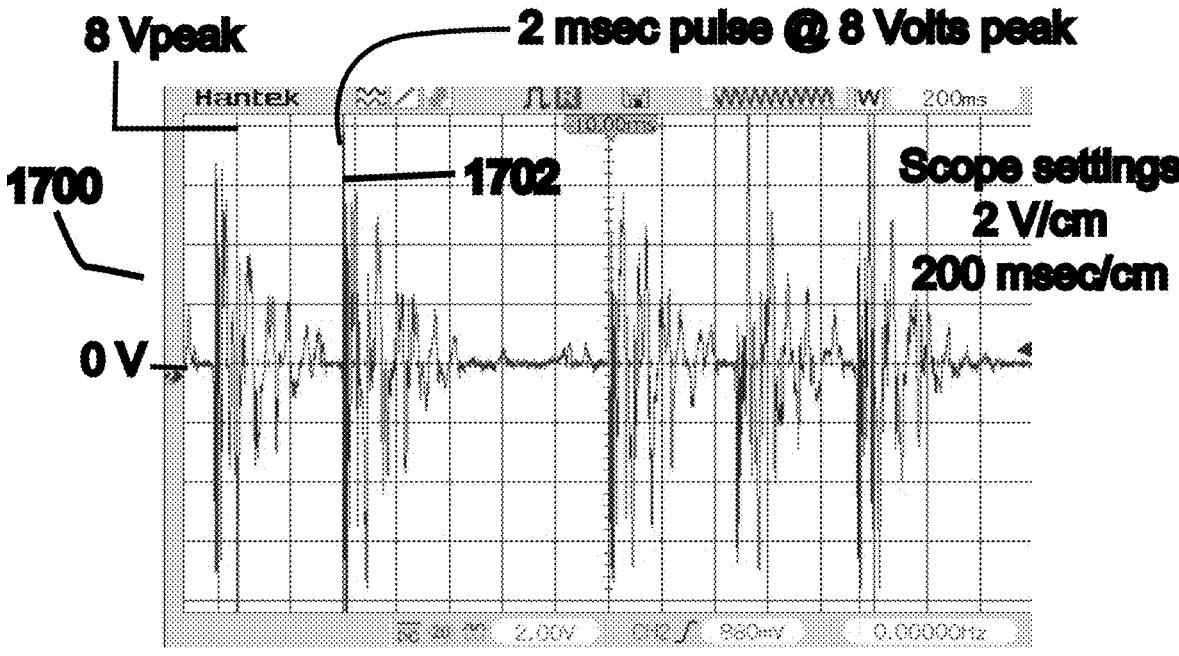
FIG. 17 is an oscilloscope trace of the generator without the enhanced magnetic metallic glass foil component of one embodiment for the present invention.

FIG. 17, 1700 is an actual oscilloscope trace 1702 of the present invention's voltage output without utilizing the magnetic metallic glass foil 26 and its associated members of the polymer plastic sheet 12 and the copper foil 10. The initial impulse action is a 1G force, and repeated vibrational actions vary from 0.1G to 1G, and the output voltage produced is a maximum of 8 Volts peak value with a diminishing number of vibrations over several seconds.

Figure 18:
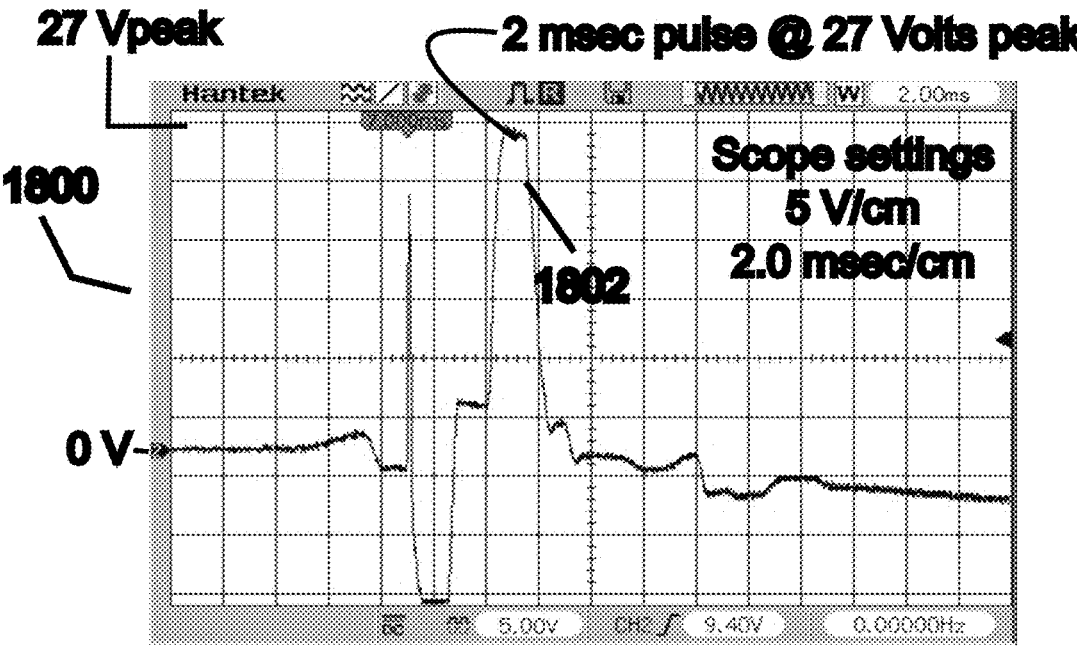
FIG. 18 is an oscilloscope trace of the generator with the enhanced magnetic metallic glass foil component of one embodiment for the present invention.

In contrast to the structure omitting an embodiment of the present invention, FIG. 18, 1800 shows an actual oscilloscope trace 1802 of the present invention's voltage output now utilizing the magnetic metallic glass foil 26 and its associated members of the polymer plastic sheet 12 and the copper foil 10 as applied to the structure used for FIG. 17 and according to an embodiment of the present invention. The initial impulse action is a single applied force of 1G. The single impulse of 1G applied was within a period of 32 milliseconds of observation showing 27 Volts peak value for a period of 2 milliseconds.

Figure 19:
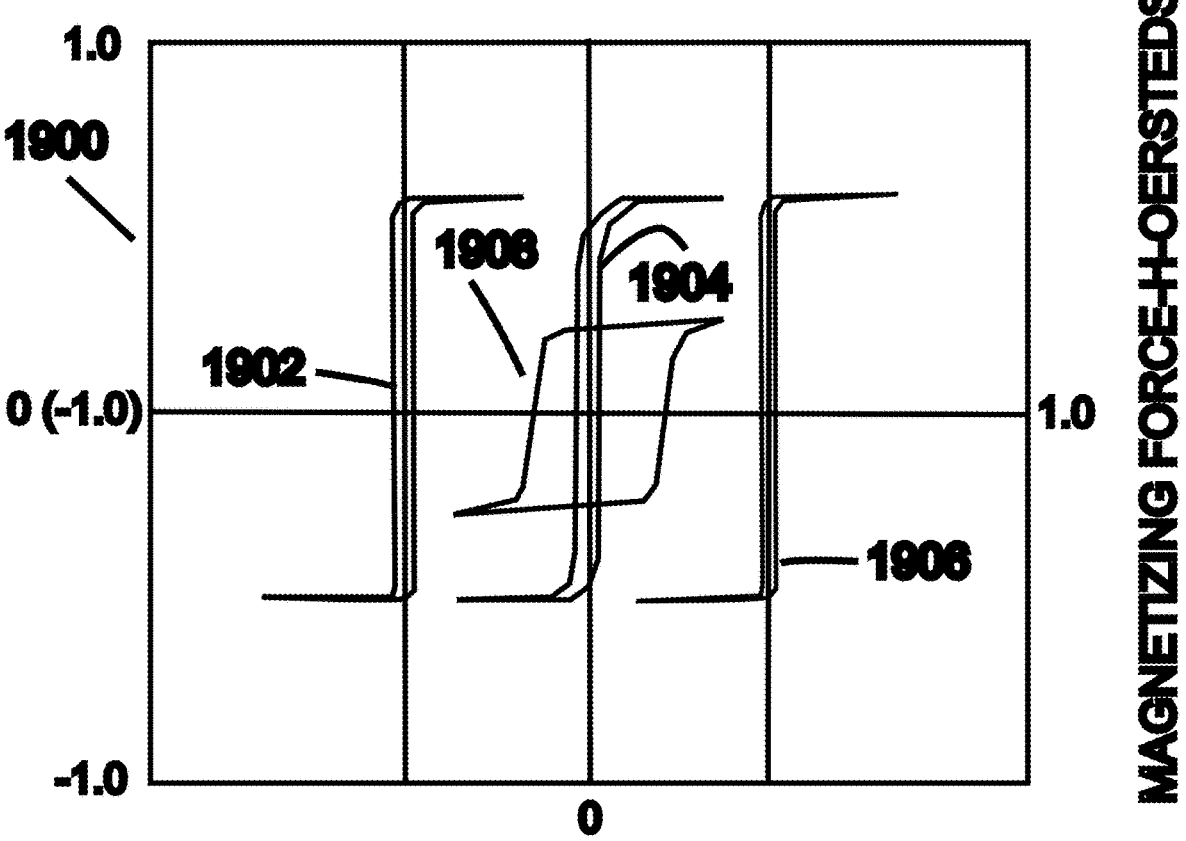
FIG. 19 is the B-H magnetic curve for an exemplary magnetic metallic glass foil (Metglas®, of type class 2714A, Colbalt-Based), of one embodiment for the present invention.

FIG. 19, 1900 shows the various Hysteresis curves for the magnetic metallic glass type 2714-A manufactured by Metglas of South Carolina, USA. The first curve 1902 is for longitudinal-field annealing, the second curve 1904 is for annealing with no-field referenced, the third curve 1906 is for transverse-field annealing, and the Hysteresis curve 1908 shows for the as-cast (with no annealing) of the magnetic metallic glass material e.g. as is available commercially or off-the-shelf.

Further modifications and substitutions of the present invention made by one of ordinary skill in the art are within the scope of the present invention, which is not limited except by the claims which follow.

What is claimed, is:

1. An electrical generator, comprising:
   a coil structure including a winding of an electrical conductor capable of inducing electricity therein in the presence of a moving magnetic field, wherein said winding includes
      an aperture about which the electrical conductor is wound and having a path, said aperture being formed through said coil structure, and having a limit structure proximal to an end of said winding length, and
      an outer surface including the winding therein and having a length substantially parallel with said path and a periphery;
   a magnet disposed to be movable at least partially through said coil aperture and having magnetic poles disposed to provide said moving magnetic field as the magnet is moved at least partially through said coil aperture in response to motions applied externally to said coil structure and limited at said end by said aperture limit structure to within said coil aperture; and
   a metallic glass layer at least partially extending around said coil structure to substantially entirely extending around said coil structure.

2. The electrical generator of claim 1, wherein said metallic glass layer comprises one of a permeability of at least $3.5 \times 10^4$.

3. The electrical generator of claim 1, wherein said metallic glass layer comprises magnetic metallic glass.

4. The electrical generator of claim 1, wherein said metallic glass layer comprises an amorphous material, and a core having a permeability of at least $2 \times 10^3$.

5. The electrical generator of claim 1, further including a polymer plastic sheet disposed adjacent to said metallic glass layer.

6. The electrical generator of claim 1, further comprising a housing retaining said coil structure and said magnet and providing an enclosed volume.

7. The electrical generator of claim 1, wherein said electricity induced in said winding has a waveform or direct current, and said electrical generator further includes an energy conversion means receiving said induced energy and providing an output energy different from said winding induced energy waveform.

8. The electrical generator of claim 1, wherein said magnet has a cross-sectional shape and said coil structure include a complementary shape providing restrictions of magnet motions along said path.

9. The electrical generator of claim 1, wherein said metallic glass layer, when disposed on said coil winding, comprises circumferential ends that at least touch.

10. The electrical generator of claim 1, wherein said metallic glass layer extends over the entire said outer surface length.

11. The electrical generator of claim 1, further including a spring disposed between said magnet and the limit structure.

12. The electrical generator of claim 11, wherein said coil structure is capable of receiving mechanical motions thereto of at least one frequency, and said magnet comprises a mass, which together with said spring having a spring constant, provides a mechanically resonant motion at least partially through said aperture including a mechanical resonance near or below said one frequency.

13. The electrical generator of claim 1, wherein said coil aperture structure includes a magnet guide surface complementing the shape of said magnet, providing substantially constant orientation of said magnet poles throughout a range of motion as said magnet is moved at least partially through said coil aperture.

14. The electrical generator of claim 13, wherein said coil structure includes a magnet guide extension to permit magnet excursion beyond one end of said coil length.

15. The electrical generator of claim 1, further including a copper foil member disposed adjacent to said metallic glass layer.

16. The electrical generator of claim 15, wherein said magnet comprises a rectangular cross-section perpendicular to said magnet motions along said path.

17. The electrical generator of claim 1, wherein said relative displacement motions are bi-directional and capable of movement of said magnet beyond an end of said coil winding opposite said limit structure.

18. The electrical generator of claim 1, wherein said coil structure and said magnet motions are substantially out of phase.

19. An electrical generator, comprising:
   a coil structure including a winding of an electrical conductor disposed over a coil length and capable of inducing electricity therein in the presence of a moving magnetic field, wherein said winding includes an aperture about which the electrical conductor is wound and having a path through said coil structure substantially parallel with said length, and a winding outer surface,
   a magnet disposed to be movable relative to said coil structure in response to motions applied externally to said coil structure, along said path axially through said coil aperture and having magnetic poles disposed to provide said moving magnetic field as the magnet is moved along said path, characterized in that:
   a metallic glass layer is disposed around said coil structure; and
   a metal foil is disposed around said metallic glass layer.

20. The electrical generator of claim 19, wherein said magnet moves at least partially through said winding aperture.

21. The electrical generator of claim 19, wherein
   the dimensions for the magnetic metallic glass layer length is 97% (+/−10%) of that of the coil winding circumferences and the thickness of the magnetic metallic glass material is in a range of 0.2 to 0.4 millimeters, and
   the metal foil comprises at least one of copper and a magnetic metal foil.

22. The electrical generator of claim 1, wherein said aperture comprises a blind hole and said limit structure comprises a blind hole closed end proximal with an end of said winding.

\* \* \* \* \*